(12) United States Patent
Seol

(10) Patent No.: US 12,391,223 B2
(45) Date of Patent: Aug. 19, 2025

(54) BRAKING DEVICE FOR VEHICLE AND BRAKING METHOD THEREFOR

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 434 days.

(21) Appl. No.: 17/504,555

(22) Filed: Oct. 19, 2021

(65) Prior Publication Data

US 2022/0169213 A1    Jun. 2, 2022

(30) Foreign Application Priority Data

Nov. 30, 2020  (KR) .......................... 10-2020-0164135

(51) Int. Cl.
*B60T 8/17*    (2006.01)
*B60T 8/171*    (2006.01)
(Continued)

(52) U.S. Cl.
CPC ............ *B60T 8/1701* (2013.01); *B60T 8/171* (2013.01); *B60T 8/175* (2013.01); *B60T 8/1761* (2013.01);
(Continued)

(58) Field of Classification Search
CPC ........ B60T 8/1701; B60T 8/171; B60T 8/175; B60T 8/1761; B60T 8/265; B60T 8/306;
(Continued)

(56) References Cited

U.S. PATENT DOCUMENTS 5,172,960 A * 12/1992 Chareire ................. B60T 13/66
    303/191
6,208,921 B1 * 3/2001 Tsunehara .............. G01B 21/22
    701/41
(Continued)

FOREIGN PATENT DOCUMENTS

CN    104169141 A    11/2014
CN    107206996 A    9/2017
(Continued)

OTHER PUBLICATIONS

Office Action issued Jun. 8, 2023 in corresponding Chinese Patent Application No. 202111405967.4.
(Continued)

*Primary Examiner* — Aniss Chad
*Assistant Examiner* — Chase L Cooley
(74) *Attorney, Agent, or Firm* — Novo TechIP International PLLC

(57) ABSTRACT

The present disclosure provides a braking method of a vehicle, comprising: a control start determination operation of determining whether traction control system (TCS) control is needed; a required pressure calculation operation of calculating required pressures, which are required for wheel brakes to brake a vehicle, of wheels when it is determined that the TCS control is needed; a control mode determination operation of determining whether the TCS control is performed in a single wheel control mode or multi-wheel control mode; and a hydraulic pressure supply operation of supplying hydraulic pressure to a low-pressure wheel brake through valve control and supplying hydraulic pressure to a
(Continued)

high-pressure wheel brake through pressure control in the multi-wheel control mode and supplying hydraulic pressure to any one wheel brake through the valve control in the single wheel control mode in order for the wheel brakes to reach the required pressures.

8 Claims, 4 Drawing Sheets

(51) Int. Cl.
*B60T 8/175* (2006.01)
*B60T 8/1761* (2006.01)
*B60T 8/26* (2006.01)
*B60T 8/30* (2006.01)
*B60T 8/48* (2006.01)

(52) U.S. Cl.
CPC .............. *B60T 8/265* (2013.01); *B60T 8/306* (2013.01); *B60T 8/4827* (2013.01); *B60T 2210/10* (2013.01); *B60Y 2400/3032* (2013.01)

(58) Field of Classification Search
CPC .... B60T 8/4827; B60T 2210/10; B60T 7/042; B60T 8/1755; B60T 8/363; B60T 13/142; B60T 13/686; B60T 13/745; B60T 2250/03; B60Y 2400/3032; B60Y 2306/09

See application file for complete search history.

(56) References Cited

U.S. PATENT DOCUMENTS

| | | | | |
|---|---|---|---|---|
| 2016/0375886 | A1* | 12/2016 | Jung | ..................... B60T 13/745 303/15 |
| 2018/0056953 | A1* | 3/2018 | Kato | ..................... B60T 13/662 |
| 2018/0339689 | A1* | 11/2018 | Jeon | ......................... B60T 8/00 |
| 2020/0001842 | A1 | 1/2020 | Seol | |

FOREIGN PATENT DOCUMENTS

| | | |
|---|---|---|
| CN | 110667542 A | 1/2020 |
| CN | 111332268 A | 6/2020 |
| JP | 2018-34537 A | 3/2018 |
| KR | 10-2018-0128183 A | 12/2018 |
| KR | 10-2020-0003476 A | 1/2020 |

OTHER PUBLICATIONS

Korean Office Action dated Dec. 9, 2024 issued in corresponding Korean Patent Application No. 10-2020-0164135.

\* cited by examiner (a)

(b)

(c)

BRAKING DEVICE FOR VEHICLE AND BRAKING METHOD THEREFOR

CROSS-REFERENCE TO RELATED APPLICATIONS

This application claims priority to and the benefit of Korean Patent Application No. 10-2020-0164135, filed on Nov. 30, 2020, the disclosure of which is incorporated herein by reference in its entirety.

BACKGROUND OF THE INVENTION

1. Field of the Invention

The present disclosure relates to a braking device for a vehicle and a braking method of a vehicle.

2. Discussion of Related Art

The contents described here provide only background information and do not constitute the related art.

Generally, in an electro-hydraulic brake system, a pedal pressure of a driver is detected by a sensor, and a braking pressure of each wheel is adjusted using a hydraulic modulator. The electro-hydraulic brake system includes the sensor, a pedal simulator, and an electronic control unit. The sensor detects a stroke distance of a pedal to allow the driver to recognize a desired braking pressure, and the pedal simulator allows the driver to feel the pedal pressure like a general hydraulic brake system. The electronic control unit determines a desired braking force of the driver through a pedal stroke sensor, a pressure sensor, and the like and drives an additional wheel brake mechanism to generate a braking force in a wheel brake.

The wheel brake mechanism generally includes a main master cylinder structure for generating hydraulic pressure and a hydraulic circuit and a plurality of valves for transmitting the hydraulic pressure generated by the main master to the wheel brake of a vehicle Methods of controlling traction control system (TCS) in a wheel brake mechanism are used in a single wheel control mode and a multi-wheel control mode. In the single wheel control mode, since hydraulic pressure is generated in only one wheel brake, the wheel brake is controlled in a method similar to a method of combined brake system (CBS) control.

However, in the multi-wheel control mode, different hydraulic pressures should be provided to two or more wheel brakes, the hydraulic pressures of the wheel brakes are controlled using inlet valves and outlet valves connected to the wheel brakes. When a vehicle starts from a stopped state through TCS multi-wheel control, there are problems in that a great deal of noise is generated when the outlet valve operates, a high duty ratio is required when a plurality of solenoid valves operate, and current consumption is high.

BRIEF SUMMARY OF THE INVENTION

The present disclosure is mainly directed to decreasing noise when an outlet valve operates by maintaining a state in which an inlet valve connected to a high-pressure wheel brake is open and controlling an inlet valve and an outlet valve connected to a low-pressure wheel brake in a multi-wheel control mode.

In addition, the present disclosure is also mainly directed to decreasing current consumption in a hydraulic circuit by minimizing the number of solenoid valves to which a current is supplied in a multi-wheel control mode.

According to at least one aspect, the present disclosure provides a braking method of a vehicle, comprising: a control start determination operation of determining whether traction control system (TCS) control is needed; a required pressure calculation operation of calculating required pressures, which are required for wheel brakes to brake a vehicle, of wheels when it is determined that the TCS control is needed; a control mode determination operation of determining whether the TCS control is performed in a single wheel control mode or multi-wheel control mode; and a hydraulic pressure supply operation of supplying hydraulic pressure to a low-pressure wheel brake through valve control and supplying hydraulic pressure to a high-pressure wheel brake through pressure control in the multi-wheel control mode and supplying hydraulic pressure to any one wheel brake through the valve control in the single wheel control mode in order for the wheel brakes to reach the required pressures.

According to the present embodiment described above, there is an effect of decreasing noise when an outlet valve operates by maintaining a state in which an inlet valve connected to a high-pressure wheel brake is open and controlling an inlet valve and an outlet valve connected to a low-pressure wheel brake in a multi-wheel control mode.

In addition, there is an effect of decreasing current consumption in a hydraulic circuit by minimizing the number of solenoid valves to which a current is supplied in a multi-wheel control mode.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Figure 1:
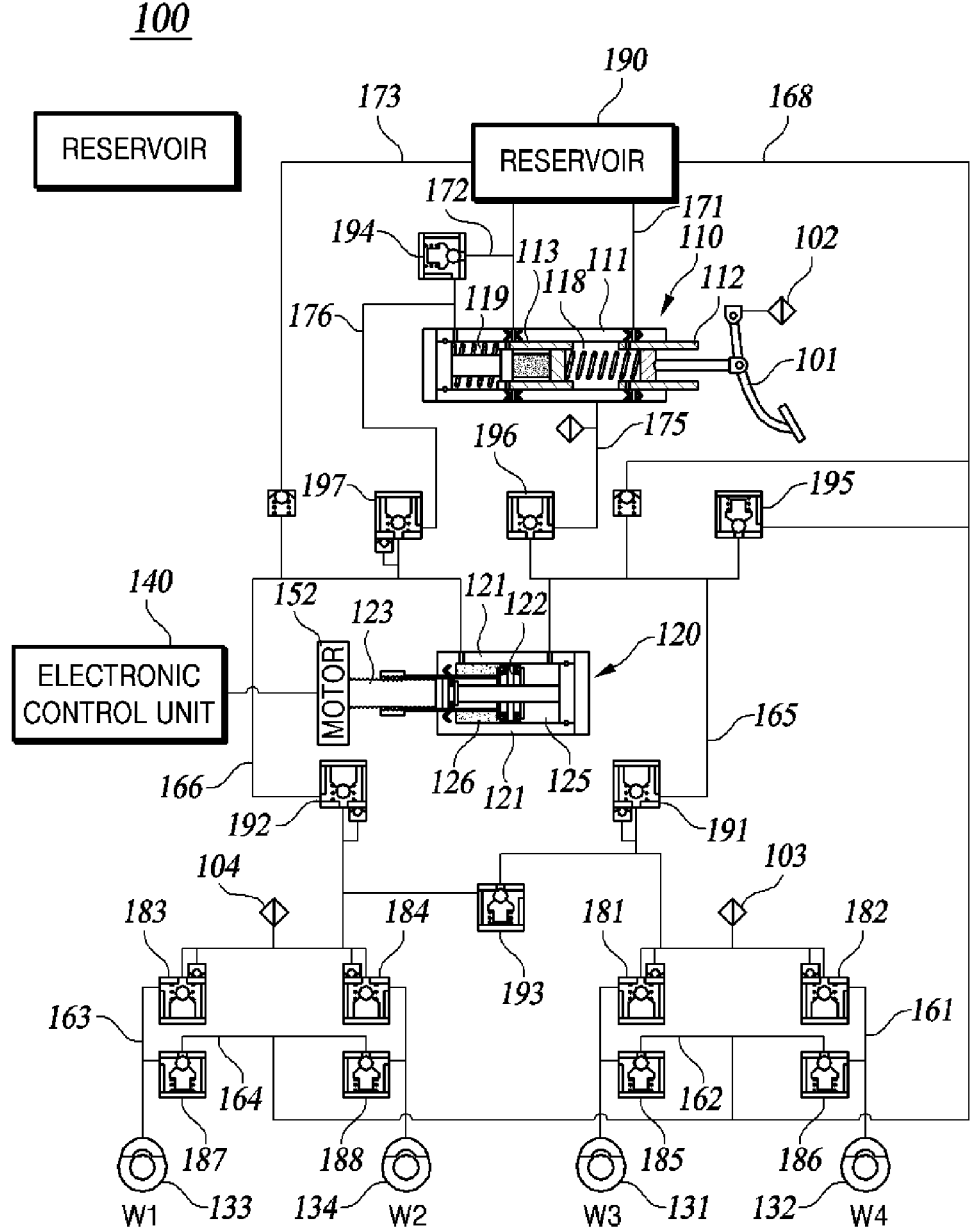
FIG. 1 is a hydraulic circuit diagram illustrating a braking device according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a hydraulic circuit diagram illustrating a braking device according to one embodiment of the present disclosure.

Referring to FIG. 1, a braking device 100 for a vehicle according to the embodiment of the present disclosure includes at least a back-up master cylinder 110, a main master cylinder 120, wheel brakes 131, 132, 133 and 134, an electronic control unit (ECU) 140, and a motor 152.

The back-up master cylinder 110 includes all or some of a back-up body 111, a first back-up piston 112, a second back-up piston 113, a first back-up chamber 118, and a second back-up chamber 119.

The back-up body 111 is formed in a structure of which an inner portion is empty. The first back-up piston 112 and the second back-up piston 113 are disposed in an inner space of the back-up body 111 to be linearly movable in a lateral direction. The inner space of the back-up body 111 is divided into the first back-up chamber 118 corresponding to a space between the first back-up piston 112 and the second back-up piston 113 and the second back-up chamber 119 positioned at a left side of the first back-up chamber 118.

The main master cylinder 120 is driven by the motor 152 controlled by the ECU 140, generates hydraulic pressure in main chambers 125 and 126, and provides the hydraulic pressure to the wheel brakes 131, 132, 133 and 134. In this case, the ECU 140 may be an ECU which is a typical control unit of a vehicle. When a driver depresses a brake pedal 101, a stroke sensor 102 detects a stroke of the brake pedal 101 and transmits the stroke to the ECU 140, and the ECU 140 controls the hydraulic pressure generated in the main master cylinder 120 by controlling the motor 152 on the basis of the stroke, which is detected by the stroke sensor 102, of the brake pedal 101.

The main master cylinder 120 includes a main body 121, a main piston 122, and a rod 123.

The main body 121 is formed in a structure of which an inner portion is empty. The main piston 122 is disposed in an inner space of the main body 121 to be linearly movable in the lateral direction. The inner space of the main body 121 is divided into two spaces, which include a first main chamber 125 that is a space disposed at a right side with respect to the main piston 122 and a second main chamber 126 that is a space disposed at a left side with respect to the main piston 122, by the main piston 122.

In the present specification, the terms "left side" and "right side" are only for indicating directions in which components are illustrated in the drawings, and the contents of the present disclosure are not interpreted as being limited to the arrangement directions and positions thereof.

When the main piston 122 moves forward in a right direction, the first main chamber 125 becomes narrow, and the second main chamber 126 becomes wider. Conversely, when the main piston 122 moves rearward in a left direction, the first main chamber 125 becomes wider, and the second main chamber 126 becomes narrow.

The wheel brakes 131, 132, 133 and 134 include a first wheel brake 131 which brakes a front left wheel of the vehicle, a second wheel brake 132 which brakes a front right wheel of the vehicle, a third wheel brake 133 which brakes a rear right wheel vehicle of the vehicle, and a fourth wheel brake 134 which brakes a rear left wheel of the vehicle. In the present disclosure, the front, rear, left, or right wheel brake may be changed within a range of a technical level of those skilled in the art.

Coupling relationships between the back-up master cylinder 110, the main master cylinder 120, and the wheel brakes 131, 132, 133 and 134 will be described.

The first wheel brake 131 and the second wheel brake 132 are connected through a first brake line 161. That is, one end of the first brake line 161 is connected to the first wheel brake 131, and the other end thereof is connected to the second wheel brake 132.

A first inlet valve 181 and a second inlet valve 182 which open or close the first brake line 161 are installed on the first brake line 161. The first inlet valve 181 is disposed adjacent to the first wheel brake 131, and the second inlet valve 182 is disposed adjacent to the second wheel brake 132.

One end of a first collection line 162 is connected to the first brake line 161 corresponding to a line between the first wheel brake 131 and the first inlet valve 181. In addition, the other end of the first collection line 162 is connected to the first brake line 161 corresponding to a line between the second wheel brake 132 and the second inlet valve 182.

A first outlet valve 185 and a second outlet valve 186 which open or close the first collection line 162 are installed on the first collection line 162. The first outlet valve 185 is disposed adjacent to one end of the first collection line 162, and the second outlet valve 186 is disposed adjacent to the other end of the first collection line 162.

The third wheel brake 133 and the fourth wheel brake 134 are connected through a second brake line 163. That is, one end of the second brake line 163 is connected to the third wheel brake 133, and the other end thereof is connected to the fourth wheel brake 134.

A third inlet valve 183 and a fourth inlet valve 184 which open or close the second brake line 163 are installed on the second brake line 163. The third inlet valve 183 is disposed adjacent to the third wheel brake 133, and the fourth inlet valve 184 is adjacent to the fourth wheel brake 134.

A check valve (not shown), which prevents a reverse flow of a brake fluid, is installed each of the first inlet valve 181, the second inlet valve 182, the third inlet valve 183, and the fourth inlet valve 184.

Meanwhile, a first pressure sensor 103 is installed on the first brake line 161 corresponding to a line between the first inlet valve 181 and the second inlet valve 182, and a second pressure sensor 104 is installed on the second brake line 163 corresponding to a line between the third inlet valve 183 and the fourth inlet valve 184.

One end of a second collection line 164 is connected to the second brake line 163 corresponding to a line between the third wheel brake 133 and the third inlet valve 183. In addition, the other end of the second collection line 164 is connected to the second brake line 163 corresponding to a line between the fourth wheel brake 134 and the fourth inlet valve 184. A third outlet valve 187 and a fourth outlet valve 188 which open or close the second collection line 164 are installed on the second collection line 164. The third outlet valve 187 is disposed adjacent to one end of the second collection line 164, and the fourth outlet valve 188 is disposed adjacent to the other end of the second collection line 164.

One end of a first main line 165 is connected to the first main chamber 125. That is, one end of the first main line 165 is connected to the main body 121 so as to fluidly communicate with the first main chamber 125. The other end of the first main line 165 is connected to the first brake line 161 corresponding to the line between the first inlet valve 181 and the second inlet valve 182.

A first traction control valve 191 which opens or closes the first main line 165 is installed on the first main line 165. The first traction control valve 191 may be a solenoid valve controlled by the ECU 140 to open or close the first main line 165 and may be installed on a line through which the hydraulic pressure of the first main chamber 125 is supplied to each of the wheel brakes 131, 132, 133 and 134.

One end of a second main line 166 is connected to the second main chamber 126. That is, one end of the second main line 166 is connected to the main body 121 so as to fluidly communicate with the second main chamber 126. In addition, the other end of the second main line 166 is connected to the second brake line 163 corresponding to the line between the third inlet valve 183 and the fourth inlet valve 184.

A second traction control valve 192 which opens or closes the second main line 166 is installed on the second main line 166. The second traction control valve 192 is a solenoid valve controlled by the ECU 140 to open or close the second main line 166 and is installed on a line through which the hydraulic pressure of the second main chamber 126 is supplied to each of the wheel brakes 131, 132, 133 and 134.

One end of a combined line is connected to the first main line 165. In addition, the other end of the combined line is connected to the second main line 166. A mixing valve 193 which opens or closes the combined line is installed on the combined line.

One end of a first back-up line 171 is connected to the first back-up chamber 118, and the other end of the first back-up line 171 is connected to the second back-up chamber 119. That is, one end of the first back-up line 171 is connected to the back-up body 111 so as to fluidly communicate with the first back-up chamber 118, and the other end thereof is connected to the back-up body 111 so as to fluidly communicate with the second back-up chamber 119. A reservoir 190 in which a brake fluid is stored is installed on the first back-up line 171.

One end of a third collection line 168 is connected to the reservoir 190. In addition, the other end of the third collection line 168 branches into two lines, one line is connected to the first collection line 162 corresponding to a line between the first outlet valve 185 and the second outlet valve 186, and the other one line is connected to the second collection line 164 corresponding to a line between the third outlet valve 187 and the fourth outlet valve 188.

One end of a second back-up line 172 is connected to the second back-up chamber 119. That is, one end of the second back-up line 172 is connected to the back-up body 111 so as to fluidly communicate with the second back-up chamber 119. The other end of the second back-up line 172 is connected to the first back-up line 171 corresponding to a line between the reservoir 190 and the back-up body 111.

A first back-up valve 194 which opens or closes the second back-up line 172 is installed on the second back-up line 172.

One end of a fifth back-up line 175 is connected to the first back-up chamber 118. That is, one end of the fifth back-up line 175 is connected to the back-up body 111 so as to fluidly communicate with the first back-up chamber 118. In addition, the other end of the fifth back-up line 175 is connected to the main body 121. A third back-up valve 196 which opens or closes the fifth back-up line 175 is installed on the fifth back-up line 175. In addition, a pressure sensor (not shown) which measures a brake fluid pressure in the fifth back-up line 175 is installed on the fifth back-up line 175. The pressure sensor is installed on the fifth back-up line 175 corresponding to a line between the back-up body 111 and the third back-up valve 196.

One end of a sixth back-up line 176 is connected to the second back-up chamber 119. That is, one end of the sixth back-up line 176 is connected to the back-up body 111 so as to fluidly communicate with the second back-up chamber 119. In addition, the other end of the sixth back-up line 176 is connected to the second main line 166 corresponding to a line between one end of the second main line 166 and the other end of a third back-up line 173. A fourth back-up valve 197 which opens or closes the sixth back-up line 176 is installed on the sixth back-up line 176.

The first inlet valve 181 to the fourth inlet valve 184, the first outlet valve 185 to the fourth outlet valve 188, the first traction control valve 191 and the second traction control valve 192, the mixing valve 193, and the first back-up valve 194 to the fourth back-up valve 197 are formed as solenoid valves controlled by the ECU 140.

Each of the first inlet valve 181, the second inlet valve 182, the third inlet valve 183, and the fourth inlet valve 184 is formed as a normal open type which is normally open when a control signal is not input from the ECU 140.

In addition, each of the first outlet valve 185, the second outlet valve 186, the third outlet valve 187, and the fourth outlet valve 188 is formed as a normal closed type which is normally closed when a control signal is not input from the ECU 140.

Each of the first traction control valve 191 and the second traction control valve 192 is formed as a normal open type. In addition, the mixing valve 193 is formed as a normal closed type.

The first back-up valve 194 is formed as a normal closed type. In addition, each of the second back-up valve 195, the third back-up valve 196, and the fourth back-up valve 197 is formed as a normal open type.

When a brake of the vehicle is controlled by the ECU 140, the ECU 140 closes all of the second back-up valve 195, the third back-up valve 196, and the fourth back-up valve 197. Then, since all of the first, second, third, fourth back-up valves 194, 195, 196, and 197 are in closed states, a line between the back-up master cylinder 110 and the main master cylinder 120 is blocked. Accordingly, in this case, the wheel brakes 131, 132, 133 and 134 generate braking forces using only hydraulic pressure supplied by the main master cylinder 120.

However, when power is not supplied to the ECU 140, the second back-up valve 195, the third back-up valve 196, and the fourth back-up valve 197 maintain open states because of being formed as normal open types.

In addition, in the case in which power is not supplied to the ECU 140, when the driver depresses the brake pedal 101, the hydraulic pressure generated in the second back-up chamber 119 by receiving a brake fluid supplied from the reservoir 190 is supplied to the second main chamber 126 through the sixth back-up line 176.

The fourth back-up valve 197 is formed on the sixth back-up line 176 which connects the back-up master cylinder 110 and the main master cylinder 120. When the ECU 140 breaks down, the fourth back-up valve 197 is configured to generate a braking force using the back-up master cylinder 110, and for example, the fourth back-up valve 197 is formed as a normal open type in which an open state is maintained even when a current is not supplied.

Figure 2:
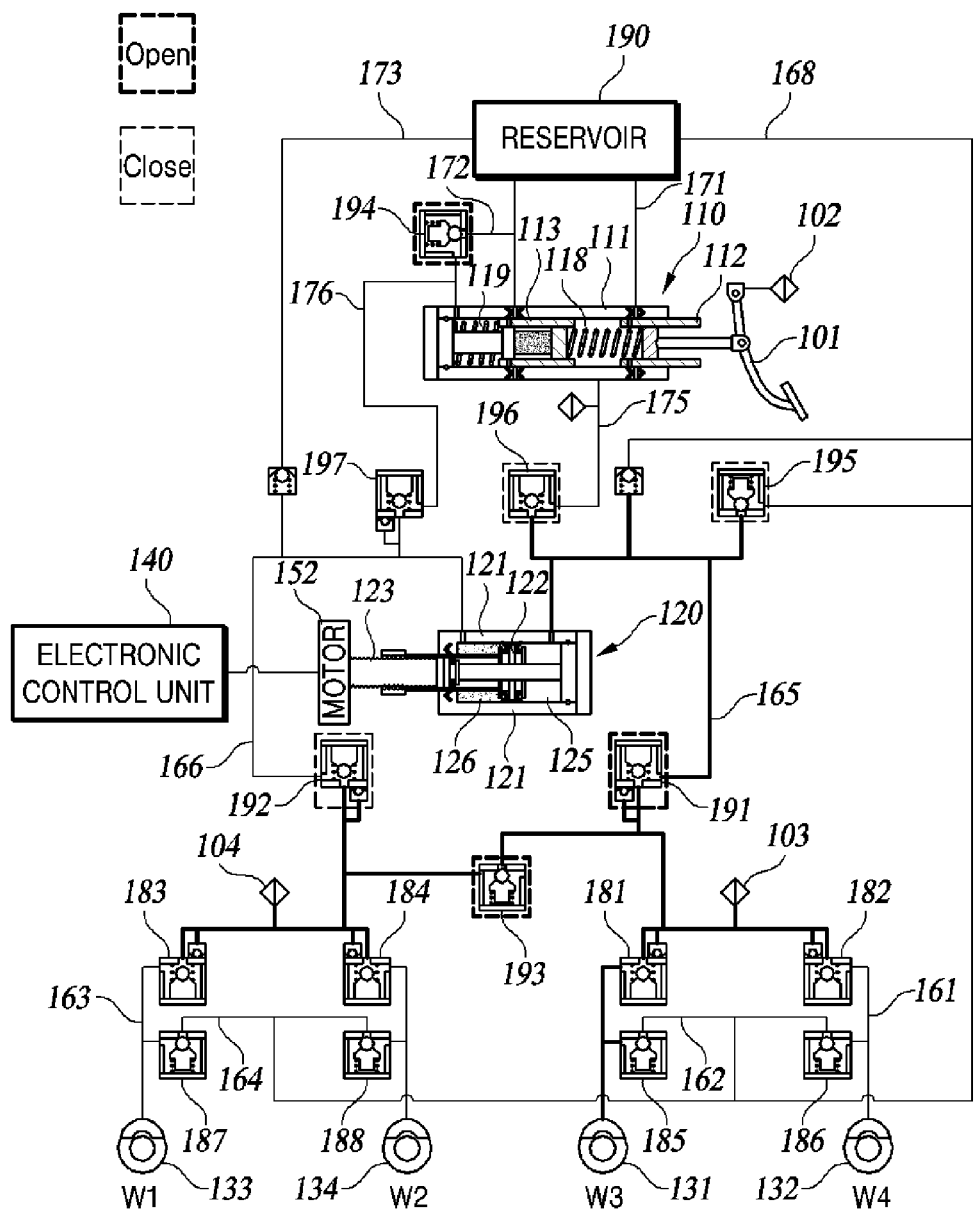
FIG. 2 is a hydraulic circuit diagram illustrating a flow of a brake fluid in order for an electronic control unit according to one embodiment of the present disclosure to increase or decrease a pressure in the hydraulic circuit in a traction control system (TCS) situation.

FIG. 2 is a hydraulic circuit diagram illustrating a flow of a brake fluid in order for the electronic control unit according to one embodiment of the present disclosure to increase or decrease a pressure in the hydraulic circuit in a traction control system (TCS) situation.

Referring to FIG. 2, a thick solid line shows a flow of a brake fluid.

A traction control system (TCS) function is a function of preventing idling of a tire to prevent the tire from slipping when a vehicle travels. When the vehicle travels on a snowy road, a rainy road, or the like in a state in which a road surface is slippery, a difference in number of rotations occurs between a left wheel and a right wheel. For example, a slippery road surface causes a tire to spin, and accordingly, the difference in number of rotations occurs between the left wheel and the right wheel. The TCS function is to prevent the difference in number of rotations from occurring between the left wheel and the right wheel by preventing idling of the tire.

When the main piston 122 moves forward, the electronic control unit 140 closes the second traction control valve 192, the third back-up valve 196, and the fourth back-up valve 197 and opens the first traction control valve 191, the mixing valve 193, and the first back-up valve 194.

Since the first traction control valve 191 and the second back-up valve 195 formed as normally open types maintain open states even when a current does not flow therein, the electronic control unit 140 may decrease current consumption by minimizing the number of solenoid valves to which a current is supplied in a multi-wheel control mode.

Meanwhile, a duty ratio, which is greater than or equal to a predetermined level, is applied to the electronic control unit 140 so that the second traction control valve 192 is not opened.

A process in which the electronic control unit 140 according to one embodiment of the present disclosure controls a low-pressure wheel brake and a high-pressure wheel brake will be described in detail with reference to FIG. 4.

Figure 3:
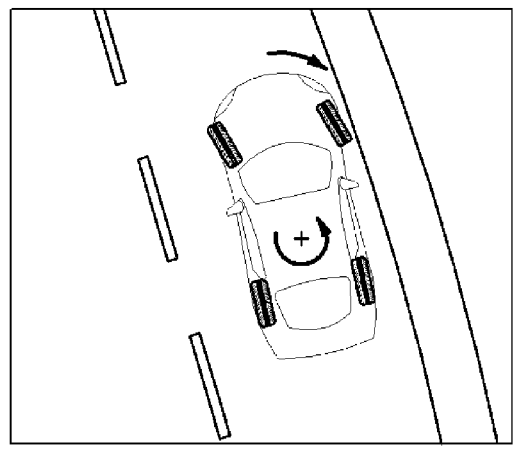
FIG. 3 show views for comparing a vehicle having a TCS function and a vehicle without having a TCS function.
Figure 3:
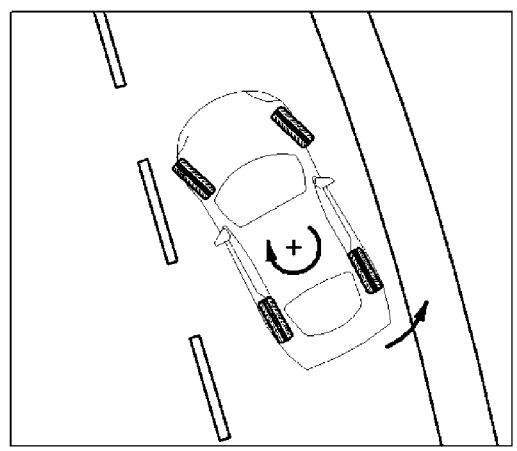
Figure 3:
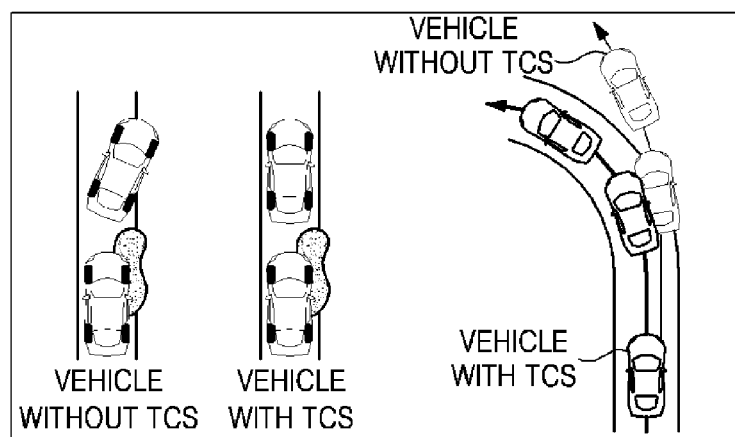

FIG. 3 shows views for comparing a vehicle having a TCS function and a vehicle without having a TCS function;

FIG. 3A is a view illustrating an understeering situation in which the front wheels of the vehicle slip, FIG. 3B is a view illustrating an oversteering situation in which the rear wheels of the vehicle slip, and FIG. 3C is a view for comparing a vehicle having TCS function and a vehicle without having a TCS function.

Referring to FIG. 3A, a cornering force generated at the rear wheel increases when the vehicle turns left with a constant radius at a constant speed. In this case, since a moment of the right front wheel or the rear wheel of the vehicle increases when compared to that of the left front wheel, even when the driver maintains a constant steering angle, a turning radius of the vehicle increases.

Meanwhile, in FIG. 3B, a cornering force generated at the front wheel increases when the vehicle turns left with a constant radius and at a constant speed. In this case, since a moment of the left front wheel or rear wheel of the vehicle increases when compared to that of the right front wheel, even when the driver maintains a constant steering angle, a turning radius of the vehicle decreases.

That is, in the situations of FIGS. 3A and 3B, when the TCS function of the vehicle does not work, the vehicle may slip and overturn.

Conversely, referring to FIG. 3C, in a vehicle in which a TCS is installed, since each of the wheels independently generates a braking force when the vehicle turns, the vehicle is not idling. Accordingly, when the vehicle in which the TCS is installed turns, the vehicle may turn a corner without slipping. In addition, the vehicle in which the TCS is installed may travel without slipping when traveling on a slippery road surface, for example, an icy surface.

Figure 4:
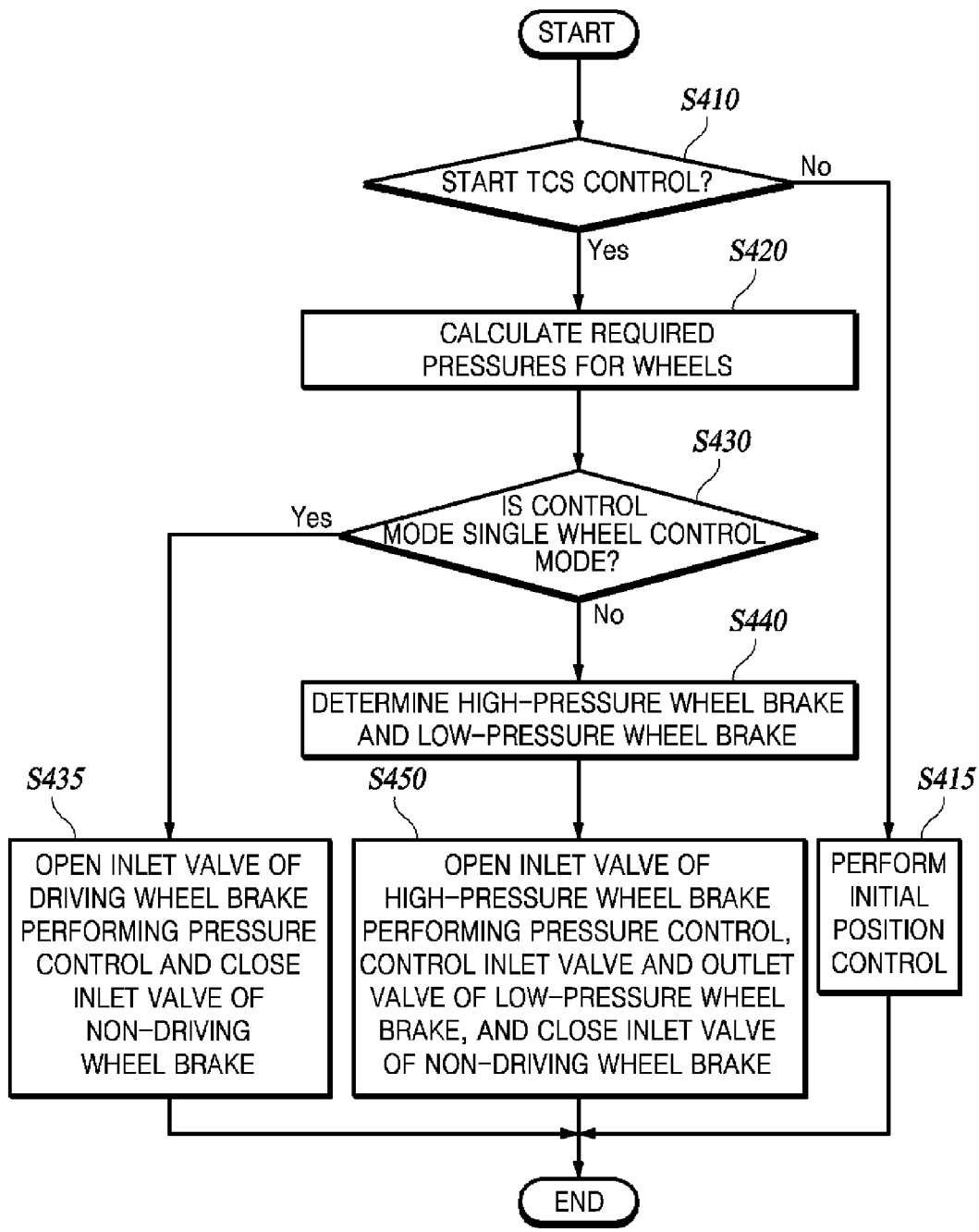
FIG. 4 is a flowchart illustrating a control process when the electronic control unit according to one embodiment of the present disclosure performs TCS control function.

FIG. 4 is a flowchart illustrating a control process when the electronic control unit according to one embodiment of the present disclosure performs a TCS control function;

Referring to FIG. 4, the electronic control unit 140 determines whether to start TCS control (S410). For example, the determination of the whether to start the TCS control function may be determined on the basis of yaw rate information detected by a yaw rate sensor installed in the vehicle. In addition, the electronic control unit 140 may determine to start the TCS control function when the wheel is idling, the driver suddenly accelerates the vehicle, or the vehicle slips.

When it is determined that the TCS control function do not start, the electronic control unit 140 performs initial position control, that is, piston initialization (S415).

On the other hand, when it is determined that the TCS control function starts, the electronic control unit 140 calculates a pressure, that is, a required pressure, needed to generate a braking force at a wheel brake so that the vehicle does not slip (S420). For example, the electronic control unit 140 may calculate what level of a braking force should be generated by which wheel brake and calculate a required pressure needed for the wheel brake on the basis of the yaw rate information detected by the yaw rate sensor.

When the required pressure is completely calculated, the electronic control unit 140 determines whether a control mode is a single wheel control mode when performing the TCS control (S430).

The control mode according to one embodiment of the present disclosure includes the single wheel control mode and a multi-wheel control mode. The single wheel control mode is a control mode in which, when the electronic control unit 140 performs the TCS control function, hydraulic pressure is supplied to only one wheel brake, and the multi-wheel control mode is a control mode in which, when the electronic control unit 140 performs the TCS control function, hydraulic pressures are supplied to at least two wheel brakes.

When it is determined that the control mode is the single wheel control mode, the electronic control unit 140 performs pressure control and valve control (S435). The pressure control corresponds to a control method in which the electronic control unit 140 supplies a current to the motor 152 so that the motor 152 rotates to move the main piston 122 in a forward direction so as to generate hydraulic pressure. Meanwhile, the valve control corresponds to a control method of opening or closing the solenoid valve to transmit the hydraulic pressure, which is generated through the pressure control, to the wheel brake. In addition, the pressure control includes forward pressure control and rearward pressure control. The forward pressure control corresponds to a control method in which the main piston 122 moves forward (in a rightward direction in FIG. 1) to generate hydraulic pressure, and the rearward pressure control corresponds to a control method in which the main piston 122 moves rearward (in a leftward direction in FIG. 1) to generate hydraulic pressure.

The electronic control unit 140 according to one embodiment of the present disclosure may change a movement direction of the main piston 122 when the main piston 122 moves forward or rearward and reaches a maximum displacement or minimum displacement at which the main piston 122 may move. That is, the electronic control unit 140 may determine whether a direction change condition is satisfied on the basis of a displacement of the main piston 122, and when the direction change condition is satisfied, the electronic control unit 140 may change the movement direction of the main piston 122. The electronic control unit 140 may apply a current to the motor 152 to change the movement direction of the main piston 122.

Operation S435 will be described in more detail. In order to prevent the vehicle from slipping, the electronic control unit 140 opens the inlet valve connected to the wheel brake in which the braking force should be generated. Meanwhile, the inlet valve connected to the wheel brake in which a braking force is not generated is closed. For example, in order to generate a braking force in the first wheel brake 131, the first inlet valve 181 is opened, and the second inlet valve 182, the third inlet valve 183, and the fourth inlet valve 184 are closed.

On the other hand, when it is determined that the control mode is the multi-wheel control mode, the electronic control unit 140 determines the high-pressure wheel brake and the low-pressure wheel brake (S440).

In the multi-wheel control mode, since at least two wheel brakes generate braking forces, a wheel brake, which generates a relatively large braking force is referred to as the high-pressure wheel brake, and a wheel brake generates a relatively small braking force is referred to as the low-pressure wheel brake.

For example, when the first wheel brake 131 and the fourth wheel brake 134 installed at a left side of the vehicle generate braking forces, a wheel brake generating a relatively large braking force is the high-pressure wheel brake.

When the high-pressure wheel brake and the low-pressure wheel brake are determined, the electronic control unit 140 performs the pressure control and the valve control (S445).

Operation S445 will be described in more detail. In order to prevent the vehicle from slipping, the electronic control unit 140 opens the inlet valve connected to the high-pressure wheel brake which should generate the braking force among the wheel brakes. Accordingly, the hydraulic pressure generated through the pressure control is supplied to the high-pressure wheel brake.

In addition, the electronic control unit 140 controls the inlet valve and the outlet valve connected to the low-pressure wheel brake. For example, the hydraulic pressure is supplied by opening the inlet valve, and a pressure is decreased using the outlet valve. That is, the pressure supplied to the low-pressure wheel brake is maintained as a low pressure by partially decreasing the hydraulic pressure, which is generated through the pressure control, using the outlet valve.

Meanwhile, the inlet valve connected to the wheel brake which does not generate a braking force is closed.

In addition, in operation S445, a supplemental current is further supplied to the motor 152 in order to prevent a sudden drop in the hydraulic circuit. In this case, the drop means that the pressure generated in the hydraulic circuit is released by momentarily switching the solenoid valve, which maintains a closed state, to an open state. That is, in a drop state, even when the motor 152 rotates, hydraulic pressure is not supplied to the wheel brake.

Accordingly, the electronic control unit 140 according to one embodiment of the present disclosure may further supply the assist current to the motor 152 so that the drop does not occur in operation S445.

After operations S415, S435, and S445 are performed, the present algorithm is finished.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. A braking device for a vehicle, the braking device comprising a reservoir, a back-up master cylinder, a main master cylinder, a plurality of valves, a motor, and a plurality of wheel brakes, the main master cylinder including a main piston, and the motor configured to move the main piston, the braking device configured to:
   determine whether a traction control system (TCS) function needs to be performed, the TCS function including preventing a wheel of the vehicle from idling;
   in response to determining that the TCS function needs to be performed, calculate a plurality of required pressures for the plurality of wheel brakes, respectively, to perform the TCS function;
   based on the calculated plurality of required pressures for the plurality of wheel brakes, determine how many of the plurality of wheel brakes needs to be supplied with a hydraulic pressure to perform the TCS function;
   in response to determining that only one of the plurality of wheel brakes needs to be supplied with the hydraulic pressure to perform the TCS function, supply, to the only one wheel brake, a first hydraulic pressure that causes the only one wheel brake to provide a first required pressure to perform the TCS function; and
   in response to determining that two or more of the plurality of wheel brakes need to be supplied with the hydraulic pressures to perform the TCS function, (1) determine, from the plurality of wheel brakes, a high-pressure wheel brake for generating a second required braking force to perform the TCS function and a low-pressure wheel brake for generating a third required braking force to perform the TCS function, the third required braking force being smaller than the second required braking force, and (2) supply, to the high-pressure and low-pressure wheel brakes, second and third hydraulic pressures, respectively, that cause the high-pressure and low-pressure brakes to respectively provide the second and third required pressures to perform the TCS function,
   wherein the braking device is further configured to supply a supplemental current to the motor to prevent a drop in the hydraulic pressure in the high-pressure wheel brake when the second and third hydraulic pressures are respectively supplied to the high-pressure and low-pressure wheel brakes.

2. The braking device of claim 1, further comprising a yaw rate sensor configured to detect a yaw rate information of the vehicle,
   wherein the braking device is further configured to determine whether the TCS function needs to be performed based on the yaw rate information.

3. The braking device of claim 1, further configured to:
   determine, based on a displacement of the main piston, whether a direction change condition is satisfied; and
   control a current applied to the motor to change a movement direction of the main piston in response to determining that the direction change condition is satisfied.

4. The braking device of claim 3, wherein the direction change condition is satisfied when the main piston moves forward to reach a maximum or minimum displacement.

5. The braking device of claim 1, wherein, to supply the first hydraulic pressure to the only one wheel brake, the braking device is further configured to open an inlet valve connected to the only one wheel brake and close inlet valves connected respectively to other wheel brakes.

6. The braking device of claim 1, wherein, to supply the second and third hydraulic pressures respectively to the high-pressure and low-pressure wheel brakes, the braking device is further configured to:
  open an inlet valve connected to the high-pressure wheel brake to supply the second hydraulic pressure to the high-pressure wheel brake;
  control inlet and outlet valves connected to the low-pressure wheel brake in order to supply the third hydraulic pressure, less than the second hydraulic pressure, to the low-pressure wheel brake; and
  close an inlet valve connected to other wheel brakes.

7. The braking device of claim 1, further configured to start performing the TCS function when at least one of a plurality of wheels is idling.

8. The braking device of claim 1, further configured to start performing the TCS function when the vehicle accelerates suddenly or slips.

* * * * *